United States Patent [19]

Zibilich, Jr.

[11] Patent Number: 4,725,990
[45] Date of Patent: Feb. 16, 1988

[54] MARINE SHEAR CABLE
[75] Inventor: Anthony M. Zibilich, Jr., Mandeville, La.
[73] Assignee: Shell Offshore Inc., Houston, Tex.
[21] Appl. No.: 797,755
[22] Filed: Nov. 12, 1985

Related U.S. Application Data
[63] Continuation of Ser. No. 495,853, May 18, 1983, abandoned.

[51] Int. Cl.⁴ .......................... G01V 1/38; H04R 1/44
[52] U.S. Cl. ......................................... 367/15; 367/19; 367/75; 181/402
[58] Field of Search ................ 367/16 J, 177; 181/401

[56] References Cited
U.S. PATENT DOCUMENTS

| | | | |
|---|---|---|---|
| 2,354,548 | 7/1944 | Richer | 367/75 |
| 2,551,417 | 5/1951 | Carlisle | 367/177 |
| 3,660,809 | 5/1972 | Peason | 367/165 |
| 3,939,464 | 2/1976 | Swenson | 367/154 |
| 4,078,223 | 3/1978 | Strange | 181/112 |
| 4,109,757 | 8/1978 | Hebberd | 181/401 |
| 4,166,229 | 7/1979 | McGough | 367/169 |
| 4,296,481 | 10/1981 | Weiss | 367/20 |
| 4,446,538 | 5/1984 | Zachariadis | 367/19 |
| 4,477,887 | 10/1984 | Berni | 181/112 |

OTHER PUBLICATIONS
Schwerg et al., "A Technique for . . . Marine Foundations", 5/8/74, O & C, vol. 1, pp. 755-762.
White et al., "Compressional to Shear Wave Conversion in Oceanic Crust", pp. 547-565, Geophs. J. R. Astr. Soc., 1980.

Primary Examiner—Nelson Moskowitz

[57] ABSTRACT

A marine cable for detecting converted shear waves reflected from the strata beneath a body of water in response to a compressional wave generated in the body of water. The cable comprises a jacket, a mount attached to the stress member, a geophone positioned in the mount, a first weight assembly attached to the stress member and positioned proximate a first end of the mount and a second weight assembly positioned proximate a second end of the mount. The mount is sized and made of a material so that its weight is sufficient to cause at least the portion of the cable jacket that is adjacent the mount to contact the seafloor. The first and second weight assemblies are sized and made of material so that their respective weights cause at least the portion of the cable jacket that is adjacent to the respective weight assemblies to contact the seafloor.

9 Claims, 5 Drawing Figures

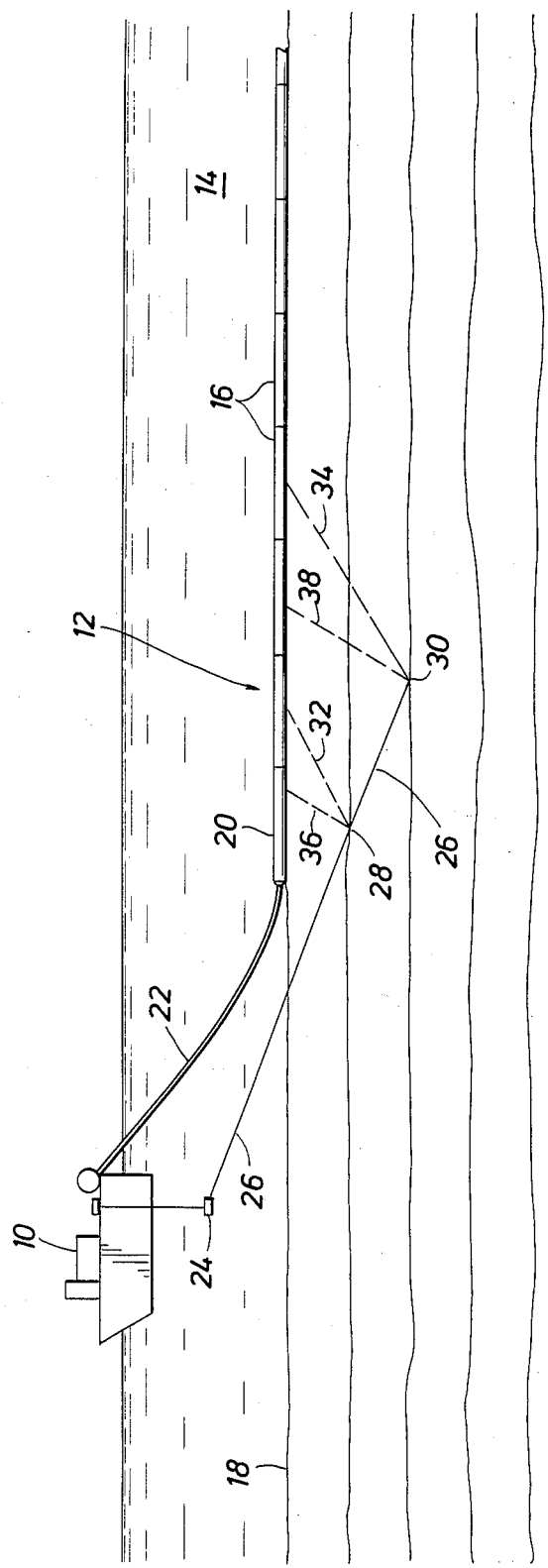
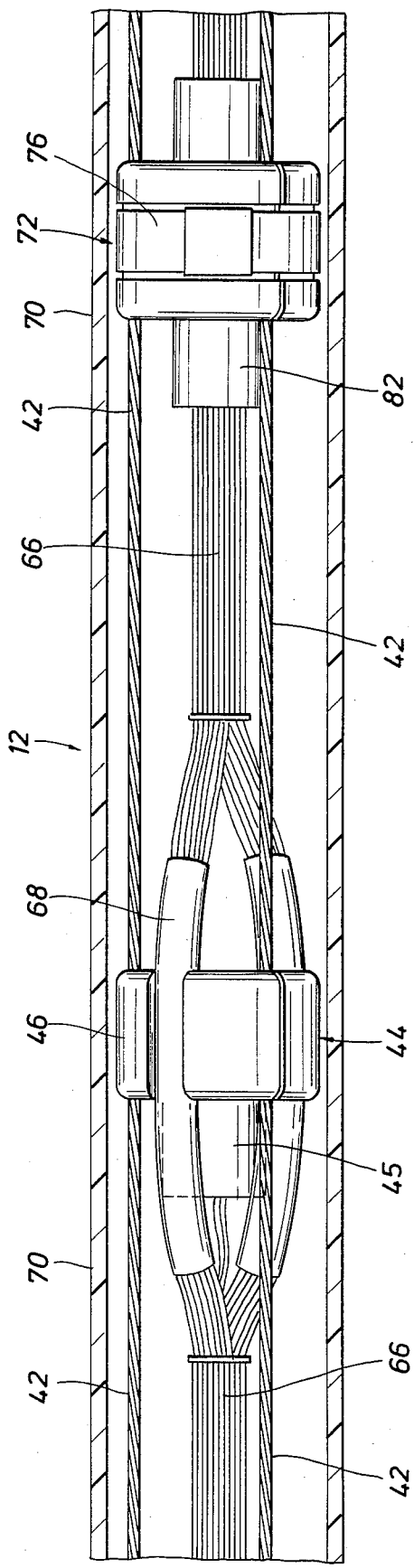
FIG.1
FIG.2

4,725,990

MARINE SHEAR CABLE

This is a continuation of application Ser. No. 495,853 filed May 18, 1983 now abandoned.

BACKGROUND OF THE INVENTION

This invention relates generally to seismic exploration of substrata beneath bodies of water and, more particularly, to marine seismic exploration conducted by sensing converted shear waves reflected from such substrata in response to a downwardly travelling compressional wave.

Marine seismic exploration is generally conducted by towing a seismic streamer at a given depth through the ocean or other body of water. The streamer is provided with a plurality of pressure sensors, such as hydrophones, disposed at appropriate intervals along its length. Compressional wave energy is provided in the vicinity of the cable by an air gun or other suitable means; this compressional wave energy travels downwardly through the earth with a portion of it being reflected upwardly at levels where there is a contrast in the acoustic impedance characteristics of the strata. The pressure sensors detect the compressional waves produced in the water by the upwardly travelling seismic reflections and provide electrical signals indicative thereof to suitable processing and recording equipment located on the seismic vessel that is towing the streamer. It has been found that shear waves are generated from the compressional waves at interfaces in the strata; these shear waves contain additional information on the nature of the strata. However, this data is not considered since the reflected shear waves are not sensed by the marine seismic systems of the prior art.

Therefore, it is an object of the present invention to provide a marine cable for detecting waves reflected from the strata during seismic exploration with a compressional source.

SUMMARY OF THE INVENTION

In accordance with the present invention there is provided a marine cable for detecting converted shear waves reflected from the strata beneath a body of water in response to a compressional wave generated in the body of water. The cable comprises a jacket, a mount attached to the stress member, a geophone positioned in the mount, a first weight assembly attached to the stress member and positioned proximate a first end of the mount and a second weight assembly positioned proximate a second end of the mount. The mount is sized and made of a material so that its weight is sufficient to cause at least the portion of the cable jacket that is adjacent the mount to contact the seafloor. The first and second weight assemblies are sized and made of material so that their respective weights cause at least the portion of the cable jacket that is adjacent to the respective weight assemblies to contact the seafloor. The cable can also comprise pressure transducers for sensing the compressional waves reflected from the strata in response to the compressional wave generated in the body of water. The pressure transducers and geophones are interspersed along the length of the cable. Preferably, weight assemblies are positioned equidistantly on each side of the geophones and pressure transducers to ensure that the cable settles to the ocean bottom so that the geophones are properly coupled thereto.

In the preferred embodiment the weight assemblies consist of three sections that are fastened together to form a cylinder. Each of the sections has a groove in each end such that when the sections are fastened together the grooves form apertures that are sized and positioned to accommodate the three stress members in the cable. The weight assemblies also have a central aperture which is sized to accommodate the group of electrical wires from the geophones and pressure transducers.

BRIEF DESCRIPTION OF THE DRAWINGS

FIG. 1 is a diagrammatic view of a seismic survey utilizing the marine cable of the present invention.

FIG. 2 is a sectional view of the marine cable of the present invention.

DETAILED DESCRIPTION OF THE PREFERRED EMBODIMENTS

Figure 4:
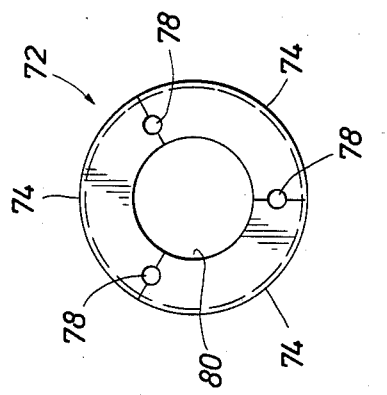
FIG. 4 is an elevational view of the weight assembly incorporated in the marine cable of FIG. 2.

Referring to FIG. 1, a seismic exploration vessel 10 is shown deploying a marine cable 12 to seismically explore the substrata that is beneath body of water 14. Cable 12 can be quite lengthy, for example, a mile or more, and is normally composed of a number of individual active sections 16 connected end to end. Each section 16 contains a plurality of geophones (not shown) and is positioned adjacent bottom 18. Cable 12 can be positioned on bottom 18 in the desired location by dragging it to the desired location or by reeling it in and then unreeling it at the desired location as vessel 10 moves forward. Section 20 of cable 12 which is connected to the first section 16 is a weighted section containing, for example, lead or other suitable material. Lead-in section 22, which can be an armored cable, connects section 20 to vessel 10. Section 20 should contain sufficient weight so that the waves in body of water 14 acting on vessel 10 and lead-in section 22 do not tend to decouple sections 16 from bottom 18. If desired, the tail end of cable 12 can also be provided with a weighted section 20 and a suitable location buoy, as is known in the art. Compressional wave energy is provided in the vicinity of cable 12 by an air gun 24 or other suitable means; air gun 24 can be deployed from vessel 10 or a second vessel which can move in the vicinity of the geophones without moving cable 12. Compressional wave 26, which is generated by air gun 24 and is indicated by a straight line, travels downwardly through body of water 14 and the earth with a portion of it being reflected upwardly at points where there is a contrast in the acoustic impedance between layers of the strata, for example, points 28 and 30, where a portion of compressional wave 26 is reflected upwardly as indicated by reflected compressional waves 32 and 34. In addition, converted shear waves 36 and 38 are reflected at points 28 and 30 respectively. Reflected shear waves 36 and 38 travel upwardly through the strata and are detected by the geophones located in sections 16 of cable 12. The electric signals produced by the geophones in response to the reflected shear waves are transmitted along wires in cable 12 to suitable recording and/or processing equipment located on vessel 10. In addition, if desired, hydrophones or other compressional wave transducers can be positioned in active sections 16 to detect reflected compressional waves 32 and 34. It should be noted that cable 12 should be allowed to settle for a predetermined period of time, for example, 10-12 seconds has been found to be a suitable length of time after the cable has been towed into position at a speed of three knots, before air gun 24 is activated to ensure that cable 12 is properly coupled to bottom 18 and to ensure that the noise transients generated during the positioning of cable 12 have been attenuated.

Figure 3:
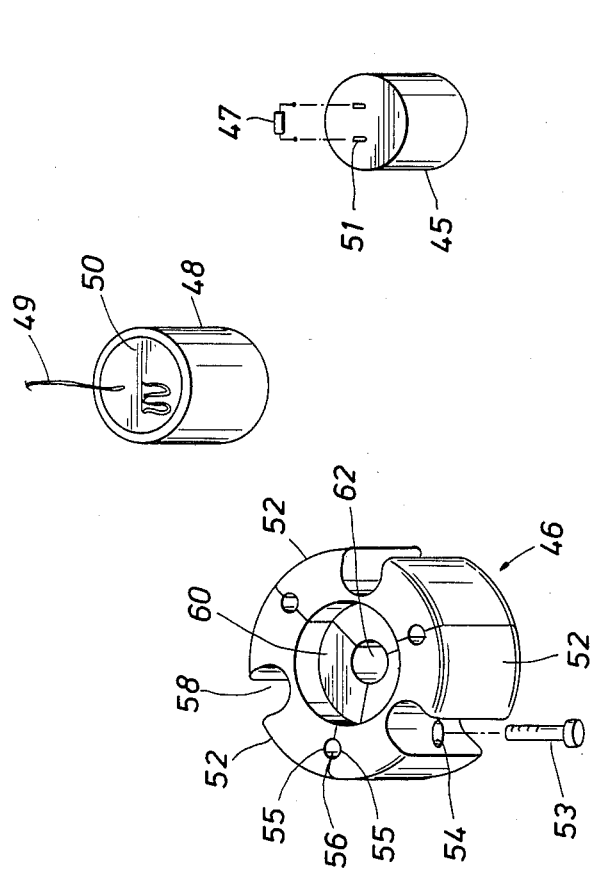
FIG. 3 is an exploded view of the geophone assembly and mount incorporated in the marine cable shown in FIG. 2.

Referring to FIGS. 2, 3 and 4, cable 12 has three stress members 42 which are maintained in the shape of an equilateral triangle by a plastic spacer (not shown), as is known in the art. At predetermined locations along cable 12 geophone assemblies 44 are positioned such that geophones 45 are in line with the axis of cable 12. Each geophone assembly 44 includes a conventional geophone 45, which is used to detect horizontal motion, and a mount 46 adapted for securing geophone 45 at a predetermined location along cable 12. A damping resistor 47 is connected across terminals 51 of geophone 45, and wires 49 are connected to terminals 51. Preferably, geophone 45 and damping resistor 47 are positioned in protective housing 48, such as PVC tubing, and the ends of housing 48 are sealed by epoxy 50 or the like to protect geophone 45 from corrosion and pressure damage. Mount 46 comprises three similarly shaped segments 52 which form a cylindrical housing or mount when assembled by screws 53 in apertures 54. Both ends of each segment 52 have a groove 55 which mates with grooves 55 in the adjacent segments 52 to form apertures 56 which are sized and positioned to accommodate the three stress members 42. Central cavity 60 is sized such that housing 48 is held securely therein when screws 53 are tightened. Mount 46 can be provided with a further smaller cavity 62 adjacent to central cavity 60 for epoxy or the like to further ensure proper bonding between mount 46 and hosuing 48. Each of sections 52 has a groove 58 in its outer surface, and approximately one-third of the wires from group of wires 66 are wrapped in a protective covering 68, such as polyurethane, and positioned in each of grooves 58. Wires 49 from terminals 51 are connected to a pair of wires from group of wires 66 by conventional means. Mount 46 should be made of a relatively heavy material that resists deformation and corrosion, such as brass, to ensure that geophone 45 is properly coupled to the ocean bottom.

Weight assembly 72 can be made of, for example, lead or other suitable material and preferably are positioned equidistantly on each side of geophone assembly 44 to ensure that cable 12 settles and is properly coupled to the ocean bottom. Weight assembly 72 consists of three sections 74 that are held together to form a cylinder by metal strap 76 or other suitable means. Each of sections 74 has a groove 75 in each end such that when sections 74 are held together by strap 76 grooves 75 form apertures 78 which are sized to accommodate stress members 42. Weight assembly 72 has a central aperture 80 which is sized to accommodate group of wires 66. A protective covering 82, such as polyurethane, can be inserted in central aperture 80 to prevent chafing of group of wires 66. Cable 12 is provided with a jacket 70 of, for example, polyurethane plastic, which provides a relatively smooth and damage resistant outer surface and is filled with a suitable liquid, such as kerosene.

Figure 5:
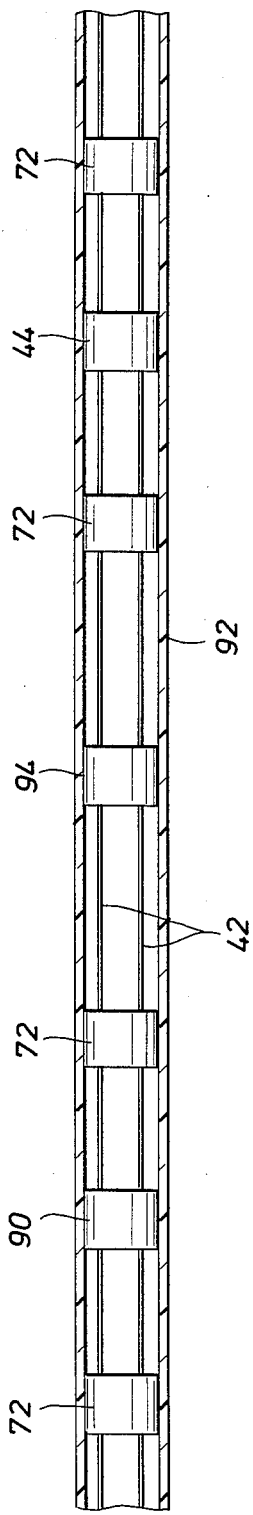
FIG. 5 is a diagrammatic view of an alternative embodiment of the marine cable of the present invention which includes geophones and pressure transducers.

FIG. 5 illustrates an alternative embodiment of the cable of the present invention which includes both geophones and pressure transducers. Geophone assemblies 44 and hydrophones 90 or other suitable pressure transducers are positioned at predetermined locations along cable 92 so that geophone assemblies 44 and hydrophones 90 are interspersed. Hydrophones 90 can be mounted by conventional means as is known in the art. Preferably, weight assemblies 72 are positioned equidistantly on each side of geophone assemblies 44 and hydrophones 90. Stress members 42 can be maintained in proper orientation by conventional spacers 94 located between geophone assemblies 44 and hydrophones 90.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A marine seismic cable, comprising:
    a mount having a size and weight to be contained within said cable and cause at least a portion of said cable adjacent said mount to contact seafloor,
    means for detecting horizontal motion disposed in said mount, and
    at least one weight assembly disposed proximate and not contiguous with said mount having a size and weight to be contained within said cable and cause at least a portion of said cable adjacent said assembly to contact seafloor.

2. A marine seismic cable as recited in claim 1, wherein said at least one weight assembly comprises first and second weight assemblies spaced from said mount by approximately the same distance.

3. A marine seismic cable as recited in claim 1, further comprising:
    means for detecting compressional waves disposed within said cable.

4. A marine seismic cable as recited in claim 1, further comprising a plurality of means for detecting horizontal motion, means for detecting compressional waves and first and second weight assemblies, said means for detecting compressional waves and said means for detecting horizontal motion being interspersed along said cable and said plurality of first and second weight assemblies being sized and made of a material so that the weight of said plurality of first and second weight assemblies is sufficient to cause essentially the entire portion of said cable that contains said plurality of means to contact the seafloor.

5. A marine seismic cable as recited in claim 1, wherein said at least one weight assembly has a plurality of sections that mate to form said weight assembly.

6. A marine seismic cable as recited in claim 5, wherein said at least one weight assembly is in the shape of a cylinder.

7. A marine seismic cable as recited in claim 6, further comprising stress members and wherein each of said sections has two surfaces that mate with the surfaces of the adjacent sections and each of said two surfaces of each of said sections has a groove that mates with the grooves in the adjacent surfaces of the adjacent sections to form apertures therein that are sized and postioned to accommodate said stress members.

8. A marine seismic cable as recited in claim 7, wherin said at least one weight assembly has a circumferential groove in the outside surface thereof and a member positioned therein and fastened such that said sections mate to form said weight assembly.

9. A marine seismic cable as recited in claim 8, further comprising a plurality of electrical wires and wherein said at least one weight assembly has central apertures that are sized to accommodate said plurality of wires.

* * * * *